United States Patent
Abe (10) Patent No.: US 9,316,031 B2
(45) Date of Patent: Apr. 19, 2016

(54) INTERIOR APPARATUS OF A VEHICLE

(71) Applicant: KOJIMA PRESS INDUSTRY CO., LTD., Toyota-shi (JP)

(72) Inventor: Tetsuya Abe, Miyoshi (JP)

(73) Assignee: KOJIMA PRESS INDUSTRY CO., LTD., Toyota-Shi (JP)

( * ) Notice: Subject to any disclaimer, the term of this patent is extended or adjusted under 35 U.S.C. 154(b) by 0 days.

(21) Appl. No.: 14/368,336

(22) PCT Filed: Dec. 12, 2012

(86) PCT No.: PCT/JP2012/082155
§ 371 (c)(1),
(2) Date: Jun. 24, 2014

(87) PCT Pub. No.: WO2013/099599
PCT Pub. Date: Jul. 4, 2013

(65) Prior Publication Data
US 2015/0240539 A1  Aug. 27, 2015

(30) Foreign Application Priority Data
Dec. 28, 2011  (JP) .................................. 2011-289002

(51) Int. Cl.
| | | |
|---|---|---|
| *E05C 1/14* | (2006.01) | |
| *E05C 1/00* | (2006.01) | |
| *B60R 7/06* | (2006.01) | |
| *E05B 63/24* | (2006.01) | |
| *E05B 83/30* | (2014.01) | |
| *E05B 83/32* | (2014.01) | |
| *E05C 9/04* | (2006.01) | |

(52) U.S. Cl.
CPC ... *E05C 1/14* (2013.01); *B60R 7/06* (2013.01); *E05B 63/248* (2013.01); *E05B 83/30* (2013.01); *E05B 83/32* (2013.01); *E05C 1/006* (2013.01); *E05C 1/145* (2013.01); *E05C 9/041* (2013.01)

(58) Field of Classification Search
CPC ............. B60R 7/06; E05C 1/14; E05C 9/041; E05C 1/006; E05C 1/145; E05B 63/248; E05B 83/30; E05B 83/32
USPC ....................................... 296/37.12
See application file for complete search history.

(56) References Cited

U.S. PATENT DOCUMENTS 4,239,277 A * 12/1980 Oda ............................ 296/37.12
2010/0071424 A1 * 3/2010 Tsuruta ............................ 70/91

FOREIGN PATENT DOCUMENTS

CN  101712310 A   5/2010
JP  2005-104192 A  4/2005

* cited by examiner

*Primary Examiner* — Glenn Dayoan
*Assistant Examiner* — Melissa A Black
(74) *Attorney, Agent, or Firm* — Kenyon & Kenyon LLP (57) ABSTRACT

An interior apparatus of a vehicle includes a converting structure. The converting structure is constructed so as to convert an operating force added on a knob to a force causing a movable member to move to an open position relative to a fixed member. Therefore, it is possible to cause the movable member to move to the open position using both a weight of the movable member and the operating force added on the knob.

5 Claims, 13 Drawing Sheets

PRIOR ART

FIG. 16

INTERIOR APPARATUS OF A VEHICLE

CROSS-REFERENCE TO RELATED APPLICATIONS

This is a national phase application based on the PCT International Patent Application No. PCT/JP2012/082155 filed Dec. 12, 2012, claiming priority to Japanese patent application No. 2011-289002 filed Dec. 28, 2011, the entire contents of both of which are incorporated herein by reference.

TECHNICAL FIELD

The present invention relates to an interior apparatus of a vehicle.

BACKGROUND

Figure 15:
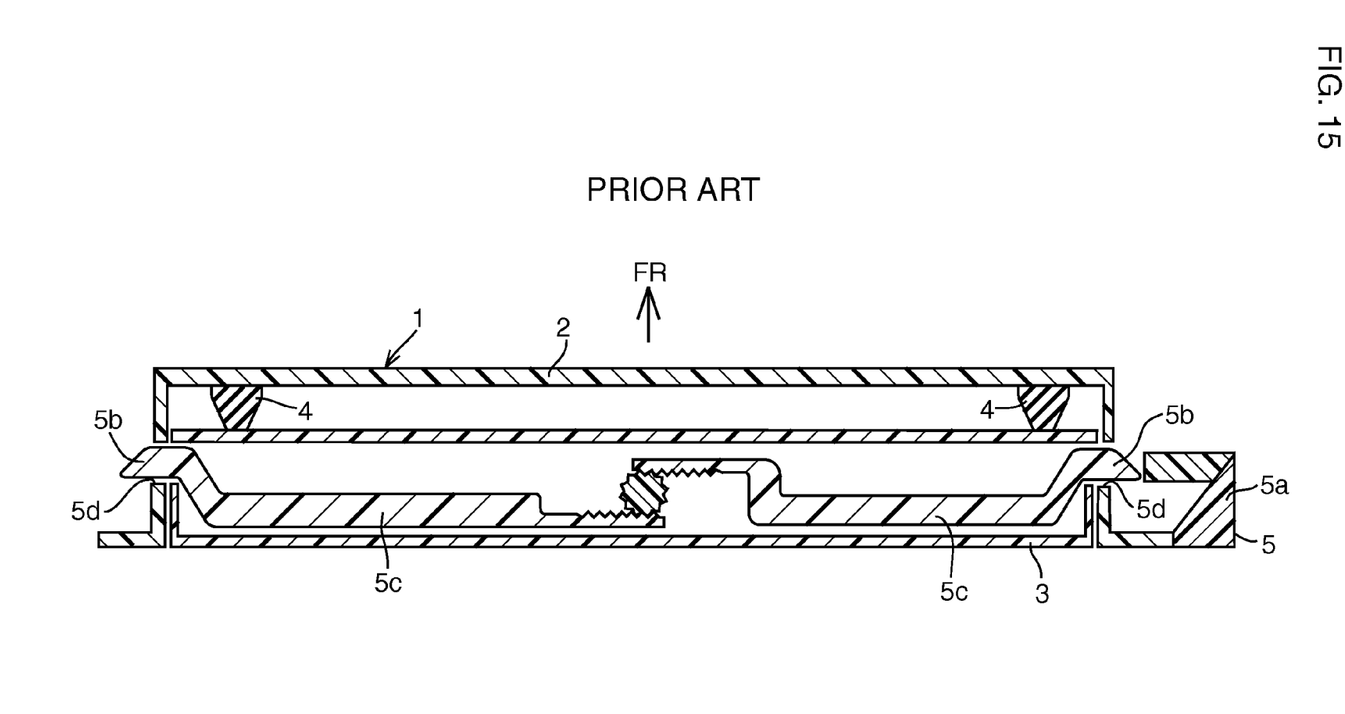
FIG. 15 is a schematic cross-sectional view of a conventional interior apparatus of a vehicle, when a movable member is at a closed position.
Figure 16:
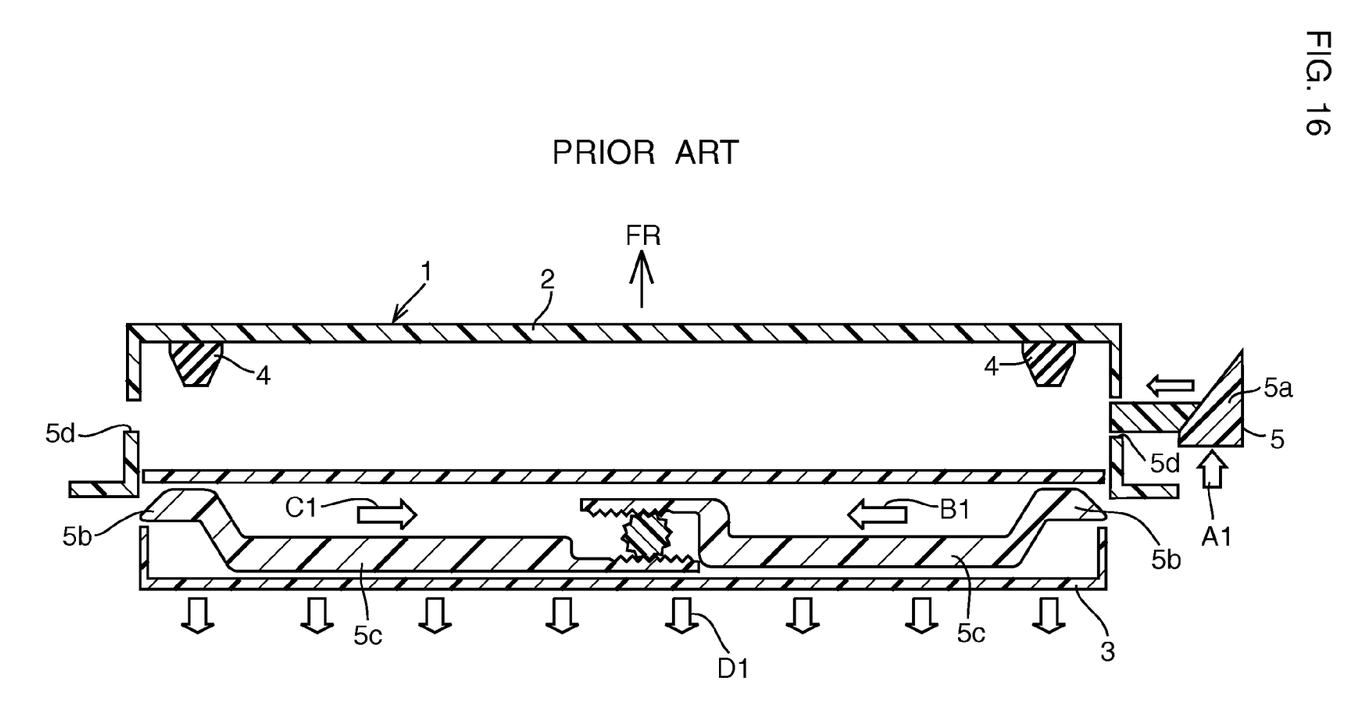
FIG. 16 is a schematic cross-sectional view of the conventional interior apparatus of a vehicle, when a push-type knob is operated and the movable member is on a way from the closed position to an open position.

FIGS. 15 and 16 illustrate a glove box of a vehicle as a conventional interior apparatus of a vehicle 1. As illustrated in FIG. 15, the interior apparatus of a vehicle 1 includes a fixed member 2, a movable member 3, a cushion rubber 4 and a lock device 5.

The movable member 3 is supported by the fixed member 2 such that the movable member can be open and closed.

The cushion rubber 4 is coupled to the fixed member 2 and contacts the movable member 3 when the movable member 3 is at a closed position.

The lock device 5 locks and unlocks the movable member 3 to and from the fixed member 2 when the movable member 3 is at the closed position. The lock device 5 includes a push-type knob 5a, a pair of rods 5c each having an end where a lock male portion 5b is formed, and a lock male receiving portion 5d.

As illustrated in FIG. 16, the lock device 5 can be unlocked by pushing the knob 5a in direction A1 thereby moving the rods 5c in opposite directions (B1 and C1) so that the lock male portions 5b are withdrawn from respective lock male receiving portions 5d. When the knob 5a is pushed and the lock device 5 is unlocked, the movable member 3 is moved in a direction toward an open position (in direction D1) by a weight of the movable member.

However, there are the following problems with the conventional interior apparatus of a vehicle:

When an ambient temperature is lower than −10 degrees (for example, at −30 degrees), the cushion rubber 4 sometimes may stick (adhere) to the movable member 3. In that case, it may be impossible to separate the cushion rubber 4 from the movable member 3 by a weight of the movable member 3 only, and thus the movable member 3 cannot move to the open position even when the lock device 5 is unlocked.

PATENT DOCUMENT

Patent Document 1: JP2005-104192

BRIEF SUMMARY

Object of the Invention

An object of the invention is to provide an interior apparatus of a vehicle which can ensure movement of a movable member to move to an open position when a lock device is unlocked.

Solutions

The present invention can achieve the above object as follows:

(1) An interior apparatus of a vehicle comprises a fixed member, a movable member, a cushion rubber, a lock device and a converting structure.

The movable member includes a rotational axis and is coupled to the fixed member so as to be rotatable about the rotational axis between an open position and a closed position.

The cushion rubber is coupled to one of the fixed member and the movable member, and contacts the other of the fixed member and the movable member when the movable member is at the closed position.

The lock device locks and unlocks the movable member to and from the fixed member when the movable member is at the closed position. The lock device includes an operating portion, a pair of lock portions, and a transmitting portion for transmitting a motion of the operating portion to each of the pair of lock portions.

The operating portion is provided on a side of the fixed member between the fixed member and the movable member. The operating portion includes a push-type knob, a shaft movable in a direction different from a direction in which the knob is moved, and a changing portion for changing a movement of the knob to a movement of the shaft.

Each of the pair of lock portions is located at each of opposite end portions of the movable member along a direction in which the rotational axis extends. Each of the pair of lock portions includes a lock female portion provided on the side of the fixed member between the fixed member and the movable member and a lock male portion provided on a side of the movable member between the fixed member and the movable member.

The transmitting portion is provided on the side of the movable member between the fixed member and the movable member. The transmitting portion is constructed so as to transmit a motion of the shaft of the operating portion to each of the pair of lock portions synchronously to each other. The transmitting portion includes a first rod, a second rod and a synchronizing portion for synchronizing the first rod and the second rod in motion in opposite directions to each other. The lock male portion of the lock portion is formed at each of an end of the first rod and an end of the second rod.

The converting structure is constructed so as to convert an operating force added on the knob to a force causing the movable member to move to the open position relative to the fixed member, when the movable member is located at the closed position and the knob is operated.

(2) An interior apparatus of a vehicle according to item (1) above wherein the converting structure includes an inclined surface formed at a member which is constructed so as to move with the knob when the knob is operated.

(3) An interior apparatus of a vehicle according to item (1) above wherein the converting structure includes a first inclined surface. The first inclined surface is formed at the lock male portion and is constructed so as to slidably contact the lock female portion when the movable member is at the closed position and the knob is operated.

(4) An interior apparatus of a vehicle according to item (1) above, wherein the converting structure includes a second inclined surface. The second inclined surface is formed at the shaft and is constructed so as to slidably contact the first rod when the movable member is at the closed position and the knob is operated.

(5) An interior apparatus of a vehicle according to item (1) above, wherein the fixed member includes a block movably coupled to the fixed member. The block contacts the movable member when the movable member is at the closed position. The converting structure includes a third inclined surface formed at the block. The third inclined surface is constructed so as to slidably contact the shaft when the movable member is at the closed position and the knob is operated.

Technical Advantages

According to the interior apparatus of a vehicle of any one of items (1)-(5) above, since the converting structure is provided and the converting structure converts the operating force added on the knob to a force causing the movable member to move to the open position relative to the fixed member, the following technical advantages can be obtained:

When the movable member is at the closed position, it is possible to cause the movable member to move to the open position using both a weight of the movable member and the operating force added on the knob. Therefore, it is possible to separate the cushion rubber coupled to the one of the fixed member and the movable member from the other of the fixed member and the movable member by operating the knob by such an operating force that a sum of the weight of the movable member and the operating force of the knob is larger than the sticking (adhering) force of the cushion rubber coupled to the one of the fixed member and the movable member and sticking to the other of the fixed member and the movable member. As a result, it is possible to ensure that the movable member moves to the open position when the lock device is unlocked by operating the push-type knob.

According to the interior apparatus of a vehicle of item (3) above, since the converting structure includes the first inclined surface and the first inclined surface is formed at the lock male portion and slidably contacts the lock female portion, the following technical advantages can be obtained:

By forming the first inclined surface at the lock male portion, it is possible to convert the operating force added on the knob to a force causing the movable member to move toward the open position relative to the fixed member. Therefore, it is relatively easy to convert the operating force added on the knob to a force causing the movable member to move to the open position relative to the fixed member.

According to the interior apparatus of a vehicle of item (4) above, since the converting structure includes the second inclined surface formed at the shaft and the second inclined surface slidably contacts the first rod, the following technical advantages can be obtained: By forming the second inclined surface at the shaft, it is possible to convert the operating force added on the knob to a force causing the movable member to move to the open position relative to the fixed member. Therefore, it is relatively easy to convert the operating force added on the knob to a force for causing the movable member to move to the open position relative to the fixed member.

According to the interior apparatus of a vehicle of item (5) above, since the fixed member includes the block movably coupled to the fixed member and the block contacts the movable member when the movable member is at the closed position, and since the converting structure includes the third inclined surface formed at the block and the third inclined surface slidably contacts the shaft, the following technical advantages can be obtained:

By forming the third inclined surface at the block, it is possible to convert the operating force added on the knob to a force causing the movable member to move to the open position relative to the fixed member. Therefore, it is relatively easy to convert the operating force added on the knob to a force causing the movable member to move to the open position relative to the fixed member.

BRIEF DESCRIPTION OF THE DRAWINGS

FIG. 1 is also applicable to a second embodiment of the present invention and a third embodiment of the present invention.

FIG. 2 is also applicable to the second embodiment and the third embodiment of the present invention.

DETAILED DESCRIPTION OF THE PREFERRED EMBODIMENTS

FIGS. 1-6 illustrate an interior apparatus of a vehicle according to a first embodiment of the present invention, FIGS. 7-10 illustrate an interior apparatus of a vehicle according to a second embodiment of the present invention, and FIGS. 11-14 illustrate an interior apparatus of a vehicle according to a third embodiment of the present invention. In the drawings, "FR" shows a front direction of a vehicle and "UP" shows an upper direction. Portions common throughout the all embodiments of the present invention are denoted with the same reference numerals throughout the all embodiments of the present invention. First, portions common throughout the all embodiments of the present invention will be explained.

An interior apparatus 10 of a vehicle (hereinafter, an interior apparatus) according to any embodiment of the present invention may be, for example, a glove box disposed at an instrument panel in front of a front passenger seat of the vehicle. The interior apparatus 10 may be an upper box of a vehicle disposed above the glove box, a console box of a vehicle disposed between a driver seat and the front passenger seat of the vehicle, or another apparatus. In the embodiments and drawings described hereinafter, the interior apparatus 10 will be the glove box of a vehicle.

Figure 3:
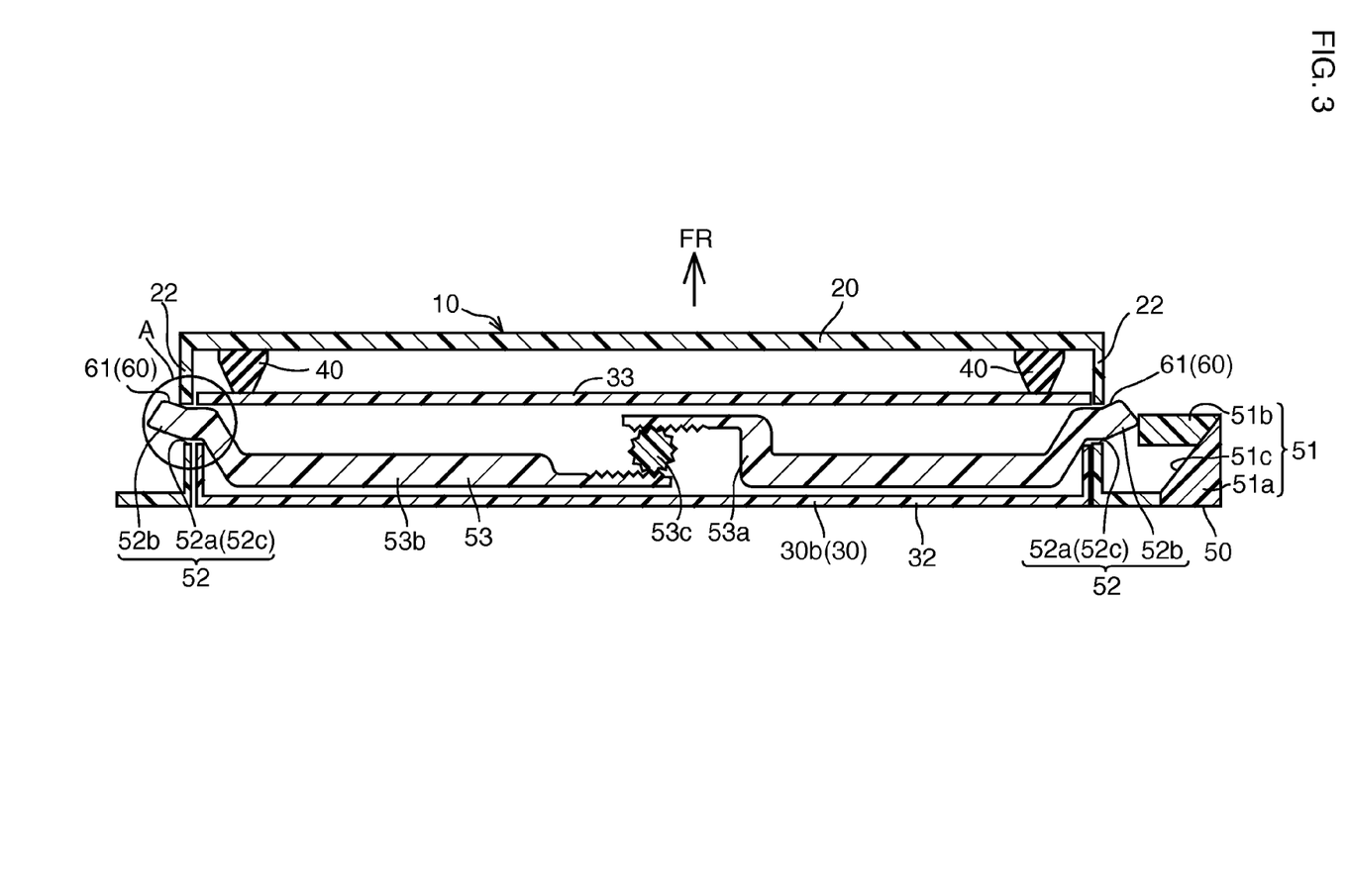
FIG. 3 is a schematic cross-sectional view of the interior apparatus of a vehicle according to the first embodiment of the present invention, when the movable member is at the closed position.

As illustrated in FIG. 3, the interior apparatus 10 includes a fixed member 20, a movable member 30, a cushion rubber 40, a lock device 50 and a converting structure 60.

Figure 1:
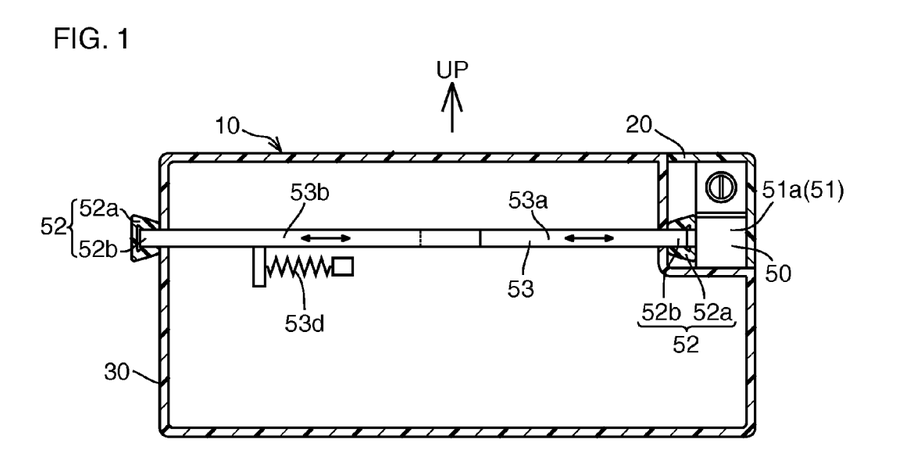
FIG. 1 is a front perspective view of an interior apparatus of a vehicle according to a first embodiment of the present invention.
Figure 2:
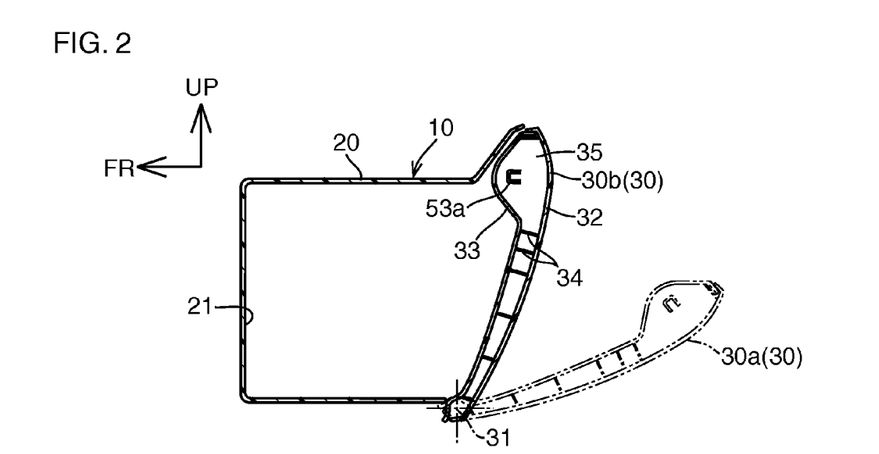
FIG. 2 is a cross-sectional view of the interior apparatus of a vehicle according to the first embodiment of the present invention, when a movable member is at a closed position.

The fixed member 20 may be the instrument panel or a member fixed to the instrument panel. As illustrated in FIG. 2, the fixed member 20 has a housing portion 21 open rearward (to an interior of the vehicle).

The movable member 30 opens and closes the housing portion 21. The movable member 30 may be a door which opens and closes the housing portion 21. The movable member 30 may have a box portion (not shown) for housing some goods therein. The movable member 30 includes a rotational axis 31, an outer member 32 and an inner member 33.

The rotational axis 31 extends in a right-left direction of the vehicle at a lower end portion (and its vicinity) of the movable member 30. The movable member 30 may be coupled to the fixed member 20 so as to be rotatable about the rotational axis 31 between an open position 30a (shown in a two-dotted chain line in FIG. 2) and a closed position 30b (shown in a continuous line in FIG. 2) in an up-down direction. When the lock device 50 is unlocked, the movable member 30 can rotate (open) about the rotational axis 31 in a direction from the closed position 30b to the open position 30a by a weight of the movable member 30 and/or a biasing force of a biasing member (not shown). When rotating (closing) the movable member 30 from the open position 30a to the closed position 30b, the movable member 30 is raised up manually about the rotational axis 31. When the lock device 50 is locked while the movable member 30 is at the closed position 30b, the movable member 30 can hold its closed position 30b relative to the fixed member 20.

The outer member 32 and the inner member 33 are fixed to each other. The outer member 32 and the inner member 33 are fixed to each other by welding or fastening an end of ribs 34 formed in at least one of the outer member 32 and the inner member 33 to the other of the outer member 32 and the inner member 33. A housing space 35 for housing rods therein is provided between the outer member 32 and the inner member 33.

The cushion rubber 40 is provided in order to suppress the movable member 30 from colliding with the fixed member 20 and generating a noise when the movable member 30 is rotated from the open position 30a to the closed position 30b, and in order to suppress the movable member 30 from rattling relative to the fixed member 20 and generating a noise when the movable member 30 is at the closed position 30b and the vehicle runs.

The cushion rubber 40 is made from rubber. Only one cushion rubber 40 may be provided, or as illustrated in FIG. 3, a plurality of cushion rubbers 40 may be provided. The cushion rubber 40 is coupled to one of the fixed member 20 and the movable member 30. The cushion rubber 40 contacts the other of the fixed member 20 and the movable member 30 when the movable member 30 is at the closed position 30b, and is separated from the other of the fixed member 20 and the movable member 30 when the movable member 30 is at the open position 30a. In the embodiment and drawings shown, the cushion rubber 40 is fixed to the fixed member 20. The cushion rubber 40 contacts the movable member 30 when the movable member 30 is at the closed position 30b, and is separated from the movable member 30 when the movable member 30 is at the open position 30a. However, the cushion rubber 40 may be fixed to the movable member 30. The cushion rubber 40 may contact the fixed member 20 when the movable member 30 is at the closed position 30b, and may be separated from the fixed member 20 when the movable member 30 is at the open position 30a.

The lock device 50 is a device for locking and unlocking the movable member 30 to and from the fixed member 20 when the movable member 30 is at the closed position 30b. The lock device 50 includes an operating portion 51, a lock portion 52 and a transmitting portion 53.

Figure 5:
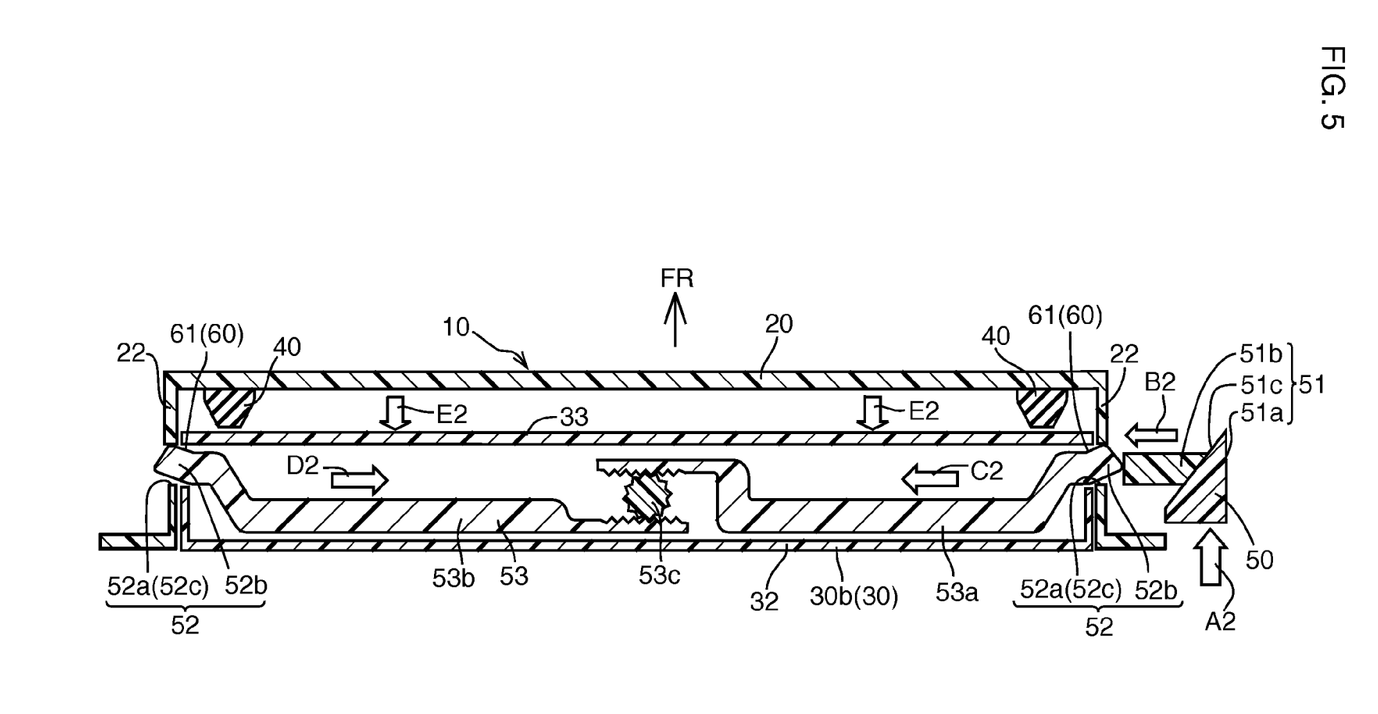
FIG. 5 is a schematic cross-sectional view of the interior apparatus of a vehicle according to the first embodiment of the present invention, when a push-type knob is operated.
Figure 6:
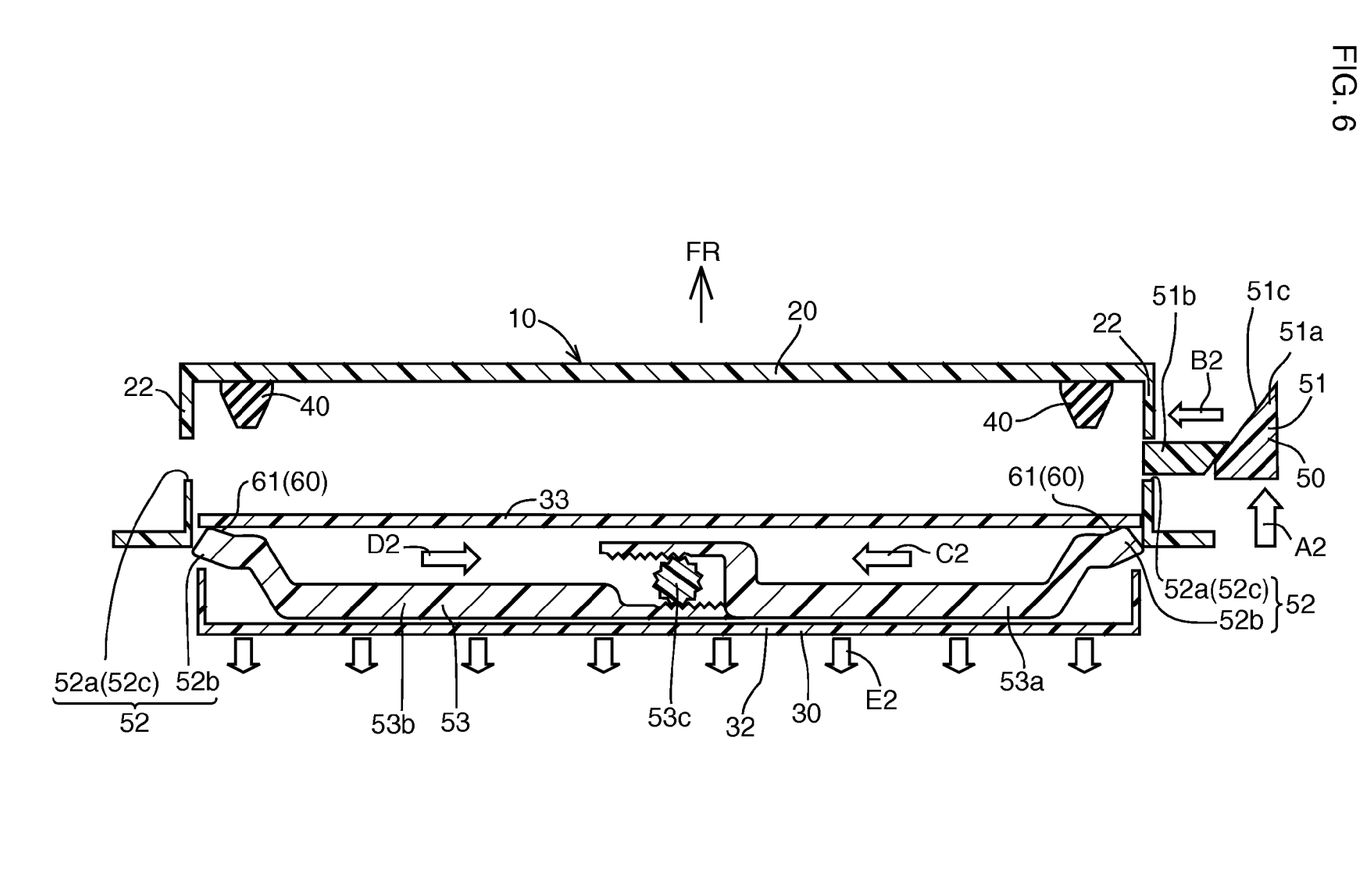
FIG. 6 is a schematic cross-sectional view of the interior apparatus of a vehicle according to the first embodiment of the present invention, when the push-type knob is operated and the movable member is on a way from the closed position to an open position.

The operating portion 51 is located at a portion of the movable member 30 closer to the driver seat than a center of the movable member 30 along the direction in which the rotational axis 31 extends (i.e., in a width direction of the movable member 30, in a right-left direction of the movable member 30, and in the right-left direction of the vehicle). The operating portion 51 is provided at the fixed member 20 between the fixed member 20 and the movable member 30. The operating portion 51 includes a push-type knob 51a, a shaft 51b movable in a direction different from (for example, perpendicular to) a direction in which the knob 51a is moved, and a changing portion 51c for changing a movement of the knob 51a to a movement of the shaft 51b. The changing portion 51c includes an inclined surface formed at the knob 51a and/or the shaft 51b. As illustrated in FIG. 5, when the knob 51a is operated (pushed) in direction A2 (in a frontward direction of the vehicle), the shaft 51b is pushed by the knob 51a via the changing portion 51c against a biasing force of a biasing member (a spring, not shown) and is moved toward the movable member 30 (in direction B2).

A pair of lock portions 52 is provided, and each of the pair of lock portions 52 is located at each of opposite end portions of the movable member 30 along the direction in which the rotational axis 31 extends. Each of the pair of lock portions 52 includes a lock female portion 52a provided on the side of the fixed member 20 between the fixed member 20 and the movable member 30, and a lock male portion 52b provided on the side of the movable member 30 between the fixed member 20 and the movable member 30. The lock male portion 52b is structured to stroke linearly relative to the lock female portion 52a. The lock female potion 52a is provided at a wall portion 22 of the fixing member 20 opposing the movable member 30 along the direction in which the rotational axis 31 extends or to a bush 22a (shown in FIGS. 11-14) fixed to the wall portion 22. The lock female potion 52a is provided with a hole 52c which the lock male portion 52b can slide into and out from.

As illustrated in FIG. 5, the transmitting portion 53 transmits a motion of the operating portion 51 to each of the pair of lock portions 52. The transmitting portion 53 is constructed so as to transmit a motion of the shaft 51b of the operating portion 51 to each of the pair of lock portions 52 synchronously relative to each other.

The transmitting portion 53 is provided at the movable member 30 between the fixed member 20 and the movable member 30.

The transmitting portion 53 includes a first rod 53a extending along the direction in which the rotational axis 31 extends, a second rod 53b extending along the direction in which the rotational axis 31 extends, and a synchronizing portion 53c for causing the first rod 53a and the second rod 53b to synchronize in motion in opposite directions to each other.

The lock male portions 52b of the lock portion 52 are formed at an end of the first rod 53a opposite the second rod 53b and an end of the second rod 53b opposite the first rod 53a. An entirety of the first rod 53a and the second rod 53b except the lock male portions 52b is always located in the housing space 35. A cross-sectional shape of the first rod 53a and the second rod 53b may be circular or noncircular. The first rod 53a and the second rod 53b are always biased by a spring 53d (shown in FIG. 1) in directions in which the lock male portions 52b engage (i.e., slide into) respective lock female portions 52a.

The synchronizing portion 53c is located in the housing space 35. As illustrated in FIG. 5, the synchronizing portion 53c may be, for example, a gear. However, the synchronizing portion 53c may be a link.

When the knob 51a is operated in direction A2 in order to unlock the lock device 50, the shaft 51b is pushed in direction B2 by the knob 51a via the changing portion 51c. As a result, the first rod 53a is pushed by the shaft 51b and is moved in direction C2. When the first rod 53a is moved in direction C2, the second rod 53b is moved in direction D2 (opposite the direction C2) by the synchronizing portion 53c. As a result, the lock male portion 52b is disengaged from the lock female portion 52a (the lock male portion 52b is moved out from the lock female portion 52a). When the lock male portion 52b is disengaged from the lock female portion 52a, the lock device 50 is unlocked.

The converting structure 60 is a structure for converting an operating force added on the knob 51a to a force causing the movable member 30 to move to the open position 30a relative to the fixed member 20, when the movable member 30 is located at the closed position 30b and the knob 51a of the lock device 50 is operated. The converting structure 60 is formed at a member constructed so as to move with the knob 51a when the knob 51b is operated.

Next, operation and technical advantages of the above-described structures common to all of the embodiments of the present invention will be explained.

(a) Since the converting structure 60 is provided and the converting structure 60 converts the operating force added on the knob 51a to a force causing the movable member 30 to move to the open position 30a relative to the fixed member 20, the following operation and technical advantages can be obtained:

When the movable member 30 is at the closed position 30b, it is possible to cause the movable member 30 to move to the open position 30a using both the weight of the movable member 30 and the operating force added on the knob 51a. Therefore, it is possible to separate the cushion rubber 40 coupled to one of the fixed member 20 and the movable member 30 from the other of the fixed member 20 and the movable member 30 by operating the knob 51a by such an operating force that a sum of the weight of the movable member 30 and the operating force of the knob 51a is larger than the sticking (adhering) force of the cushion rubber 40 coupled to the one of the fixed member 20 and the movable member 30 and sticking (adhering) to the other of the fixed member 20 and the movable member 30. As a result, it is possible to cause the movable member 30 to surely move to the open position 30a when the lock device 50 is unlocked by operating the push-type knob 51a.

(b) Since the knob 51a is of a push type, the following operation and technical advantages can be obtained:

It is easy to operate the knob 51a compared with a case where the knob 51a is of a rotation type. Since unlike a rotation-type knob which is provided at the movable member, a recess used for inserting a finger is not required to be provided in the movable member 30 at a rear of the knob 51a. As a result, an appearance of the movable member 30 is good.

Next, portions unique to each embodiment of the present invention will be explained.

Embodiment 1

FIGS. 1-6

Figure 4:
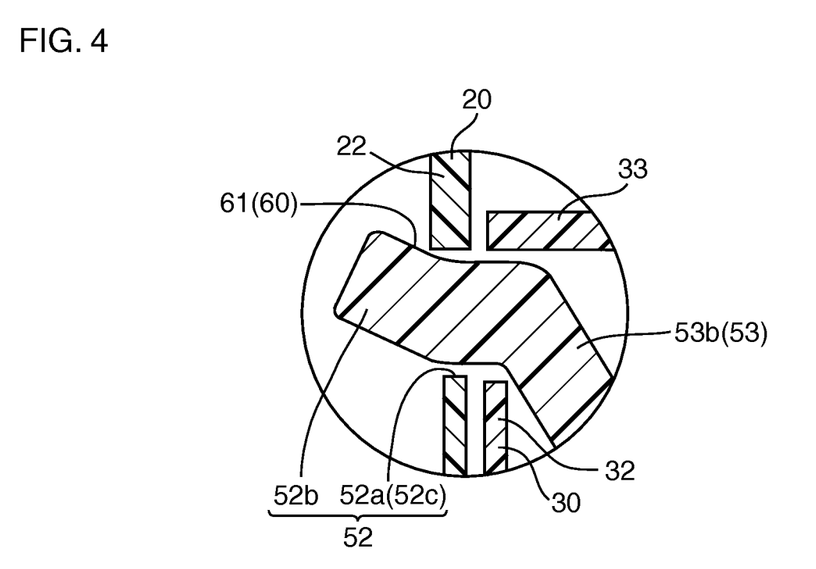
FIG. 4 is an enlarged view of portion A of FIG. 3.

In Embodiment 1 of the present invention, as illustrated in FIG. 4, the converting structure 60 includes a first inclined surface 61. The first inclined surface 61 is formed at each of the lock male portions 52b (of the first rod 53a and second rod 53b), and is constructed so as to slidably contact the lock female portion 52a when the movable member 30 is at the closed position 30b and the knob 51a is operated.

The first inclined surface 61 may be a flat surface or a curved surface. The first inclined surface 61 is inclined relative to a direction in which the lock male portion 52b is moved. The first inclined surface 61 is inclined in a direction in which the lock male portion 52b engages with the lock female portion 52a (i.e., a direction in which the inserting amount of the lock male portion 52b into the hole 52c becomes large) and in a direction in which the movable member 30 is moved from the open position 30a toward the closed position 30b.

As illustrated in FIG. 5, the first inclined surface 61 slidably contacts (interferes with) a hole 52c-defining edge of the lock female portion 52a when the lock male portion 52b is withdrawn from the lock female potion 52a. Therefore, when the knob 51a is pushed, the lock male portion 52b is pushed by the lock female portion 52a in a direction in which the movable member 30 is moved from the closed position 30b toward the open position 30a. The force which the lock male portion 52b receives from the lock female portion 52a is a force which causes the first rod 53a and the second rod 53b at which the lock male portion 52b is formed, to move in the direction in which the movable member 30 is moved from the closed position 30b toward the open position 30a, and therefore a force which causes the movable member 30 provided with the first rod 53a and the second rod 53b to move in the direction (direction E2) in which the movable member 30 is moved from the closed position 30b toward the open position 30a.

In Embodiment 1 of the present invention, since the converting structure 60 includes the first inclined surface 61 and the first inclined surface 61 is formed at the lock male portion 52b and slidably contacts the lock female portion 52a, the following technical advantages can be obtained:

By only forming the first inclined surface 61 at the lock male portion 52b, it is possible to convert the operating force added on the knob 51a to a force causing the movable member 30 to move toward the open position 30a relative to the fixed member 20. Therefore, it is possible to relatively easily convert the operating force added on the knob 51a to a force causing the movable member 30 to move toward the open position 30a relative to the fixed member 20.

Embodiment 2

FIGS. 7-10

Figure 7:
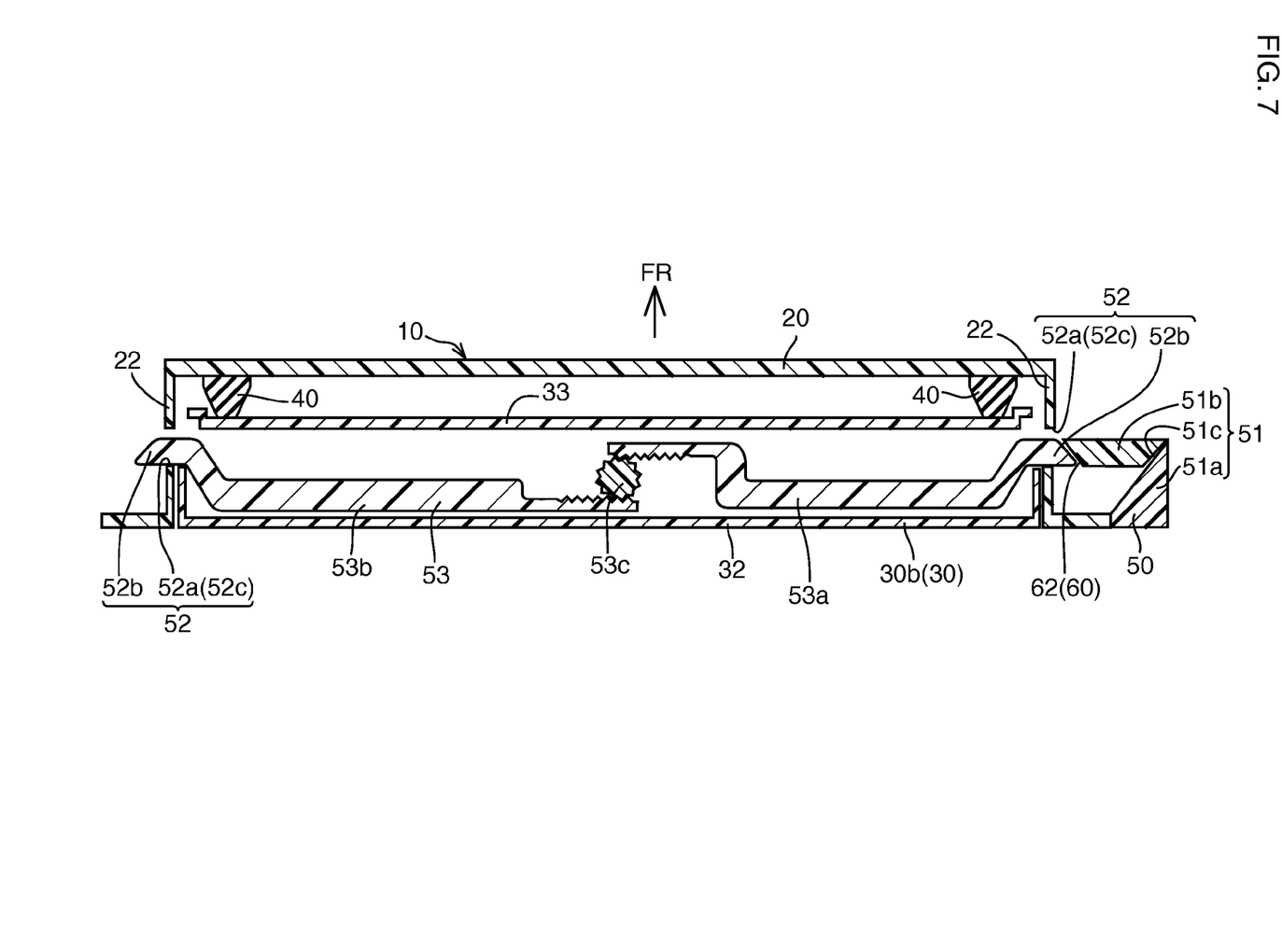
FIG. 7 is a schematic cross-sectional view of an interior apparatus of a vehicle according to a second embodiment of the present invention, when a movable member is at a closed position.

In Embodiment 2 of the present invention, as illustrated in FIG. 7, the converting structure 60 includes a second inclined surface 62. The second inclined surface 62 is formed at the shaft 51b and is constructed so as to slidably contact the first rod 53a when the movable member 30 is at the closed position 30b and the knob 51a is operated.

The second inclined surface 62 is formed at an end of the shaft 51b on the side of the first rod 53a. The second inclined surface 62 may be a flat surface or a curved surface. The second inclined surface 62 is inclined relative to the direction in which the shaft 51b is moved. The second inclined surface 62 is inclined in a direction away from the first rod 53a and in the direction in which the movable member 30 is moved from the closed position 30b toward the open position 30a.

Figure 8:
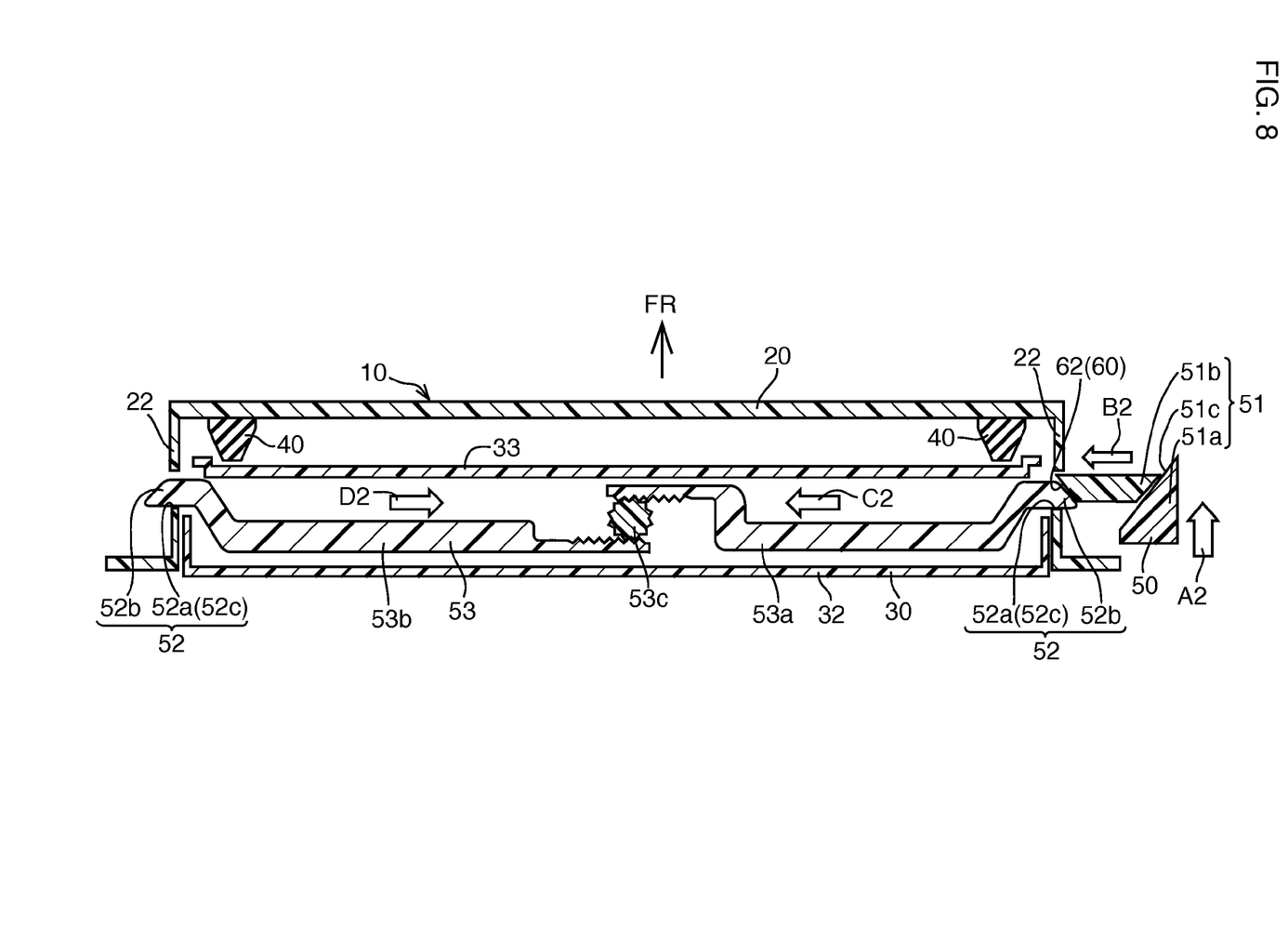
FIG. 8 is a schematic cross-sectional view of the interior apparatus of a vehicle according to the second embodiment of the present invention, when a push-type knob begins to be operated.
Figure 9:
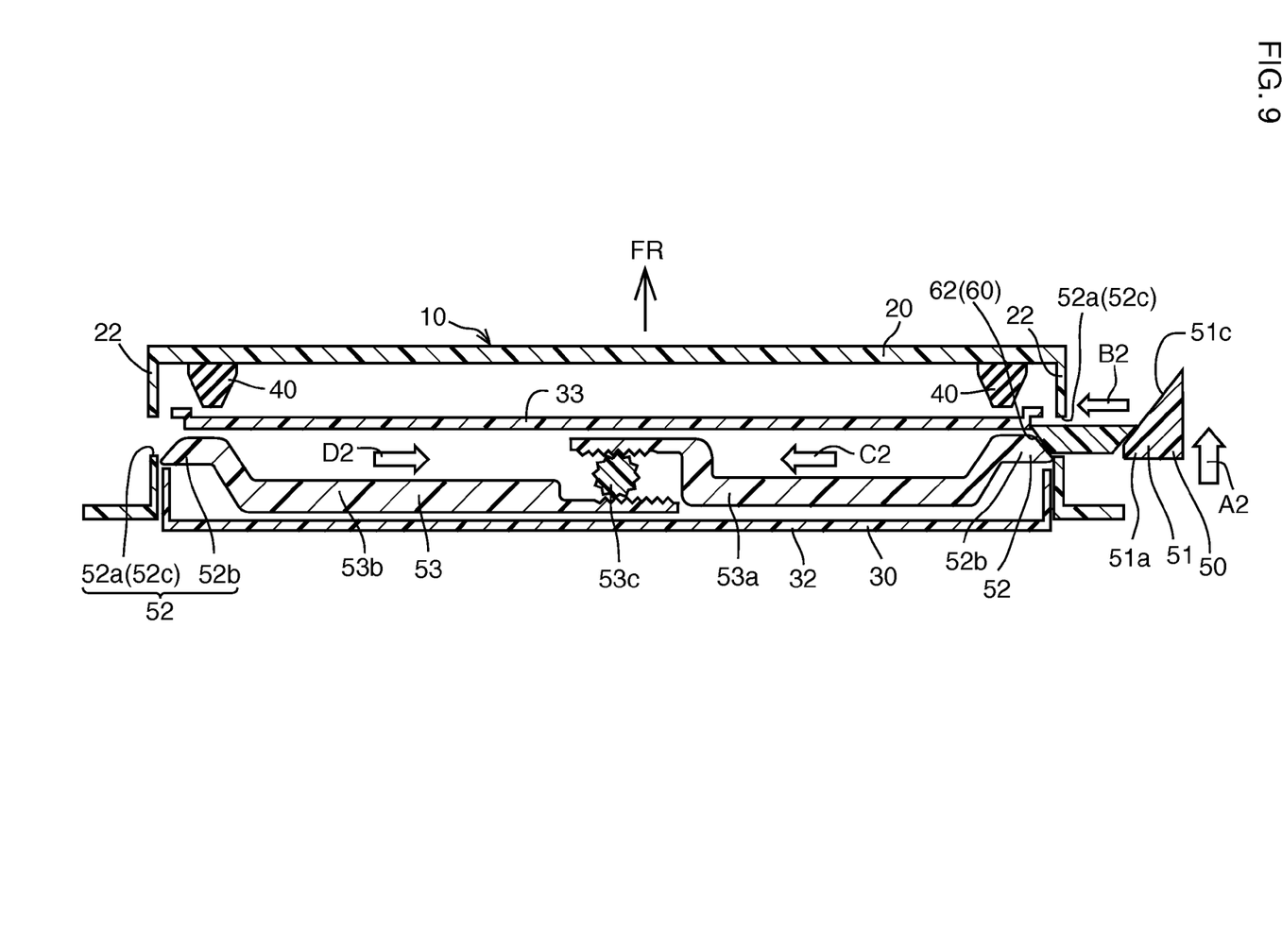
FIG. 9 is a schematic cross-sectional view of the interior apparatus of a vehicle according to the second embodiment of the present invention, when the push-type knob is further operated than in FIG. 8.
Figure 10:
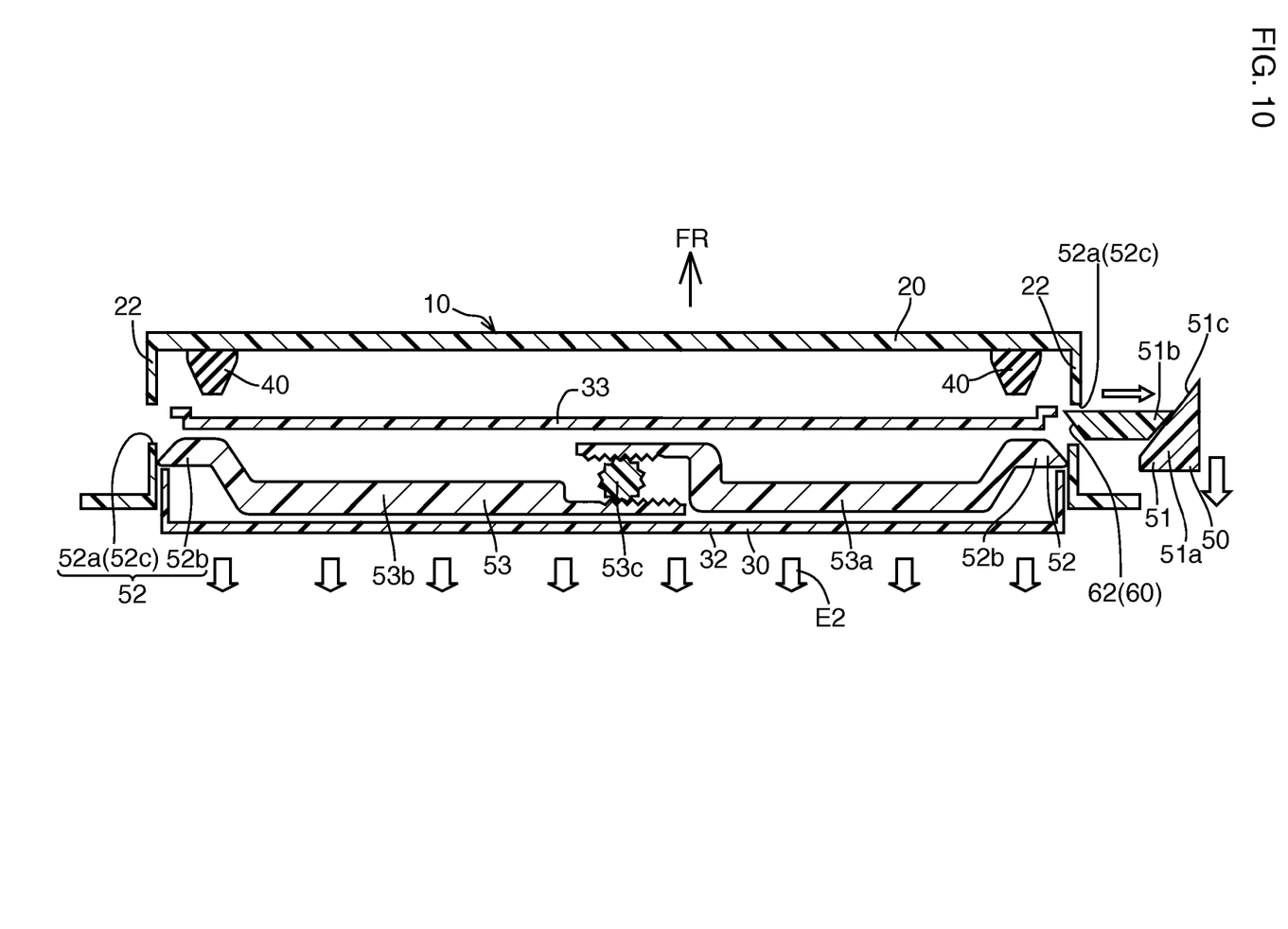
FIG. 10 is a schematic cross-sectional view of the interior apparatus of a vehicle according to the second embodiment of the present invention, when the push-type knob is operated and the movable member is on a way from the closed position to an open position.

As illustrated in FIGS. 8 and 9, the second inclined surface 62 slidably contacts the first rod 53a when the knob 51a is operated in direction A2 whereby the shaft 51b is moved in a direction toward the first rod 53a (in direction B2). Therefore, when the knob 51a is operated, the first rod 53a is pushed by the shaft 51b in the direction in which the movable member 30 is moved from the closed position 30b toward the open position 30a. The force which the first rod 53a receives from the shaft 51b is a force which causes the movable member 30 provided with the first rod 53a to move in the direction (direction E2 shown in FIG. 10) in which the movable member 30 is moved from the closed position 30b toward the open position 30a.

In Embodiment 2 of the present invention, since the converting structure 60 includes the second inclined surface 62 formed at the shaft 51b and the second inclined surface 62 slidably contacts the first rod 53a, the following technical advantages can be obtained: By only forming the second inclined surface 62 at the shaft 51b, it is possible to convert the operating force added on the knob 51a to a force causing the movable member 30 to move toward the open position 30a relative to the fixed member 20. Therefore, it is possible to relatively easily convert the operating force added on the knob 51a to a force for causing the movable member 30 to move toward the open position 30a relative to the fixed member 20.

Embodiment 3

FIGS. 11-15

Figure 11:
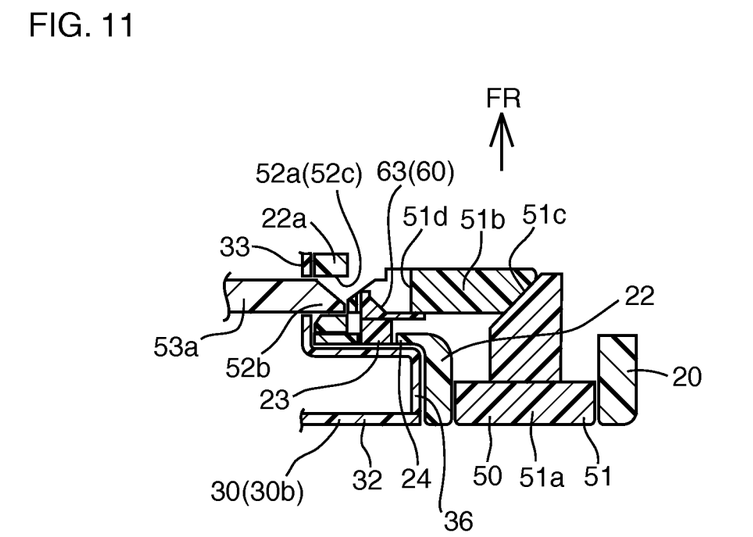
FIG. 11 is a schematic enlarged cross-sectional view of a push-type knob and its vicinity of an interior apparatus of a vehicle according to a third embodiment of the present invention, when a movable member is at a closed position.

In Embodiment 3 of the present invention, as illustrated in FIG. 11, the fixed member 20 includes a block 23. The block 23 is movably coupled to the fixed member 20. The block 23 contacts the movable member 30 when the movable member 30 is at the closed position 30b. The block 23 is spaced away from the movable member 30 when the movable member 30 is at the open position 30a. The converting structure 60 includes a third inclined surface 63. The third inclined surface 63 is formed at the block 23. The third inclined surface 63 is constructed so as to slidably contact the shaft 51b when the movable member 30 is at the closed position 30b and the knob 51a is operated.

The fixed member 20 includes a stepped portion 24 at a rear-side (cabin-side) end portion of the fixed member 20, for enlarging a volume of the housing portion 21 of the fixed member 20. The movable member 30 includes an outwardly extending portion 36 which extends into a space portion inside the housing portion 21 enlarged by the stepped portion 24 when the movable member 30 is at the closed position 30b. When the movable member 30 is at the closed position 30b, the stepped portion 24 and the outwardly extending portion 36 oppose each other in the direction in which the movable member 30 is moved relative to the fixed member 20.

Figure 13:
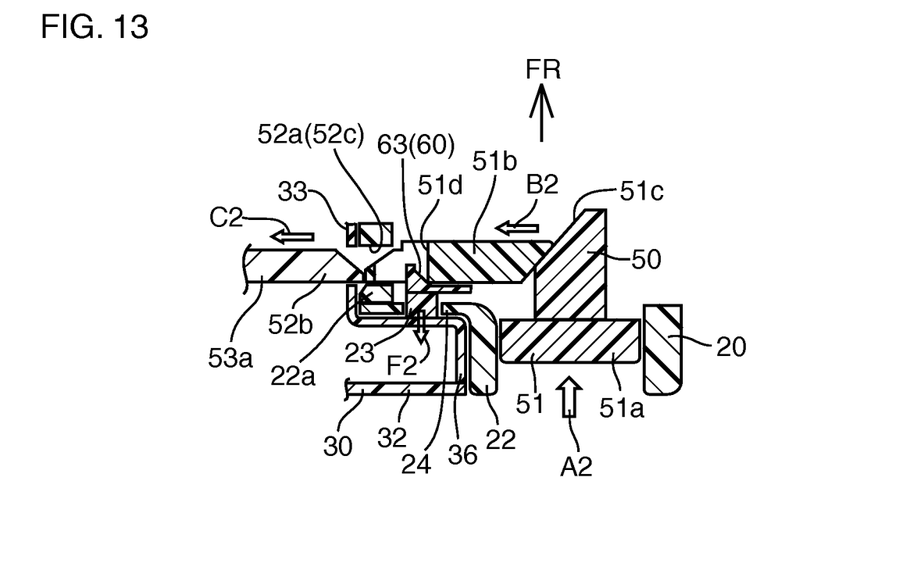
FIG. 13 is a schematic enlarged cross-sectional view of the push-type knob and its vicinity of the interior apparatus of a vehicle according to the third embodiment of the present invention, when the push-type knob is further operated than in FIG. 12.

The block 23 is coupled to the stepped portion 24 so as to be movable reciprocally and straight in the direction in which the movable member 30 is moved relative to the fixed member 20. As illustrated in FIG. 13, the third inclined surface 63 is constructed so as to slidably contact a block-contacting portion 51d provided at the shaft 51b when the knob 51a is operated in direction A2 whereby the shaft 51b is moved in direction B2.

The third inclined surface 63 may be a flat surface or a curved surface. The third inclined surface 63 is inclined relative to the direction in which the block 23 is moved. The third inclined surface 63 is inclined (i) in the direction (in direction B2) in which the shaft 51b is moved when the knob 51a is operated in direction A2 and (ii) in the direction in which the movable member 30 is moved in the direction from the open position 30a toward the closed position 30b.

Operation of Embodiment 3 of the present invention will be explained.

Figure 12:
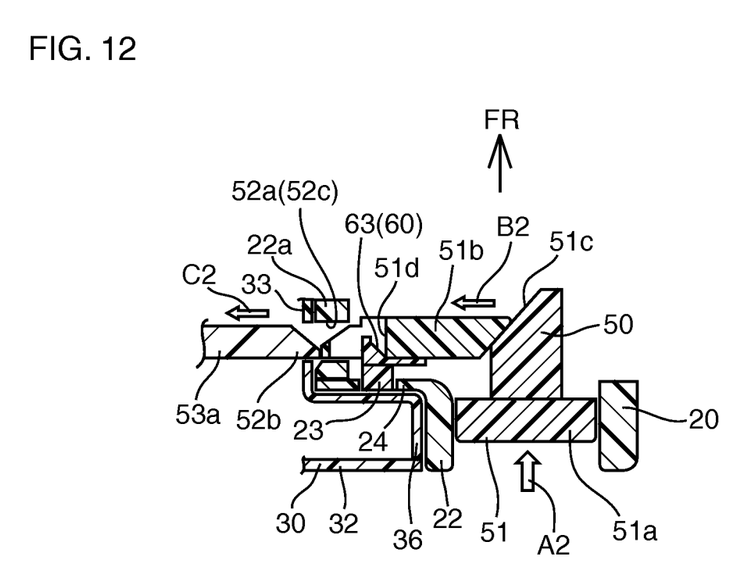
FIG. 12 is a schematic enlarged cross-sectional view of the push-type knob and its vicinity of the interior apparatus of a vehicle according to the third embodiment of the present invention, when the push-type knob begins to be operated.

(a) When the movable member 30 is at the closed position 30b as illustrated in FIG. 11, and when the knob 51a is operated in direction A2 as shown in FIG. 12 whereby the shaft 51b begins to move in the direction toward the first rod 53a (in direction B2 as shown in FIG. 12), the shaft 51b pushes the first rod 53a in the direction in which the lock male portion 52b is withdrawn from the lock female potion 52a (in direction C2 as shown in FIG. 12), before slidably contacting with the third surface 63 and causing the block 23 to move.

(b) As illustrated in FIG. 12, when the knob 51a is further operated in direction A2 whereby the shaft 51b is further moved in direction B2, the lock male portion 52b is withdrawn from the lock female potion 52a. At the same (substantially same) time when the lock male portion 52b is withdrawn from the lock female portion 52a, the block-contacting portion 51d of the shaft 51b begins to slidably contact the third inclined surface 63.

Figure 14:
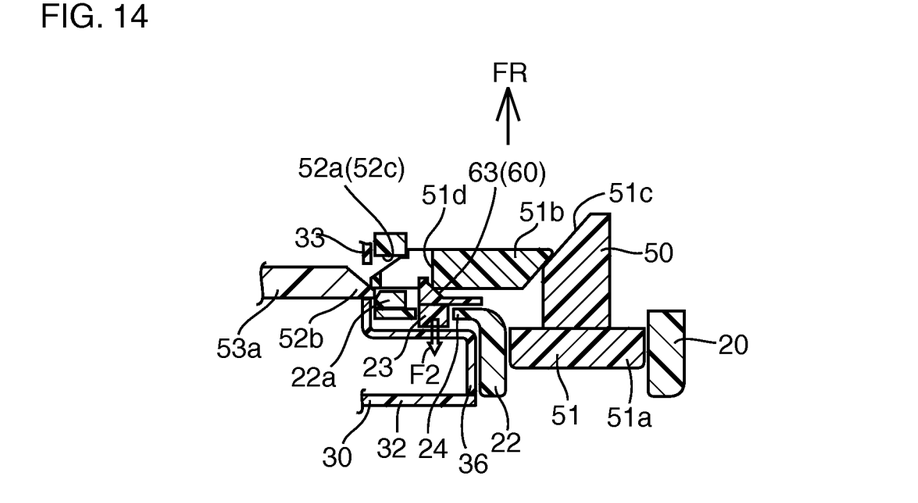
FIG. 14 is a schematic enlarged cross-sectional view of the push-type knob and its vicinity of the interior apparatus of a vehicle according to the third embodiment of the present invention, when the push-type knob is further operated than in FIG. 13.

(c) As illustrated in FIG. 13, when the knob 51a is further operated in direction A2 whereby the shaft 51b is further moved in direction B2, the block-contacting portion 51d slidably contacts the third inclined surface 63 as the lock male portion 52b is withdrawn from the lock female portion 52a. As illustrated in FIG. 14, since the block-contacting portion 51d slidably contacts the third inclined surface 63, the block 23 is moved relative to the stepped portion 24 of the fixed member 20 in the direction in which the movable member 30 is moved from the closed position 30b toward the open position 30a (in direction F2), and the block 23 pushes the outwardly extending portion 36 of the movable member 30 in the direction in which the movable member 30 is moved from the closed position 30b toward the open position 30a (in direction F2).

In Embodiment 3 of the present invention, since the fixed member 20 includes the block 23 movably coupled to the fixed member 20 and the block 23 contacts the movable member 30 when the movable member 30 is at the closed position 30b, and since the converting structure 60 includes the third inclined surface 63 formed at the block 23 and the third inclined surface 63 slidably contacts the shaft 51b, the following technical advantages can be obtained:

By only forming the third inclined surface 63 at the block 23, it is possible to convert the operating force added on the knob 51a to a force causing the movable member 30 to move to the open position 30a relative to the fixed member 20. Therefore, it is possible to relatively easily convert the operating force added on the knob 51a to a force causing the movable member 30 to move to the open position 30a relative to the fixed member 20.

EXPLANATION OF REFERENCE NUMERALS 10 interior apparatus of a vehicle
20 fixed member
21 housing portion
23 block
24 stepped portion
30 movable member
30a open position
30b closed position
31 rotational axis
32 outer member
33 inner member
36 outwardly extending portion
40 cushion rubber
50 lock device
51 operating portion
51a push-type knob
51b shaft
51c changing portion
51d block-contacting portion
52 lock portion
52a lock female portion
52b lock male portion
52c hole
53 transmitting portion
53a first rod
53b second rod
53c synchronizing portion
53d spring
60 converting structure
61 first inclined surface
62 second inclined surface
63 third inclined surface

The invention claimed is:

1. An interior apparatus of a vehicle comprising: a fixed member, a movable member, a cushion rubber, a lock device and a converting structure,
wherein the movable member includes a rotational axis and is coupled to the fixed member so as to be rotatable about the rotational axis between an open position and a closed position,
wherein the cushion rubber is coupled to one of the fixed member and the movable member, and contacts the other of the fixed member and the movable member when the movable member is at the closed position,
wherein the lock device locks and unlocks the movable member to and from the fixed member when the movable member is at the closed position, and the lock device includes an operating portion, a pair of lock portions, and a transmitting portion for transmitting a motion of the operating portion to each of the pair of lock portions,
wherein the operating portion is provided on a side of the fixed member between the fixed member and the movable member, and the operating portion includes a push-type knob, a shaft movable in a direction different from a direction in which the knob is moved, and a changing portion for changing a movement of the knob to a movement of the shaft,
wherein each of the pair of lock portions is located at each of opposite end portions of the movable member along a direction in which the rotational axis extends, and each of the pair of lock portions includes a lock female portion provided on the side of the fixed member between the fixed member and the movable member and a lock male portion provided on a side of the movable member between the fixed member and the movable member,
wherein the transmitting portion is provided on the side of the movable member between the fixed member and the movable member, the transmitting portion is constructed so as to transmit a motion of the shaft of the operating portion to each of the pair of lock portions synchronously relative to each other, the transmitting portion includes a first rod, a second rod and a synchronizing portion for synchronizing the first rod and the second rod in motion in opposite directions to each other, and the lock male portion of the lock portion is formed at each of an end of the first rod and an end of the second rod, and
wherein the converting structure is constructed so as to convert an operating force added on the knob to a force causing the movable member to move to the open position relative to the fixed member, when the movable member is located at the closed position and the knob is operated.

2. An interior apparatus of a vehicle according to claim 1, wherein the converting structure includes an inclined surface formed at a member which is constructed so as to move with the knob when the knob is operated.

3. An interior apparatus of a vehicle according to claim 1, wherein the converting structure includes a first inclined surface, and the first inclined surface is formed at the lock male portion and is constructed so as to slidably contact the lock female portion when the movable member is at the closed position and the knob is operated.

4. An interior apparatus of a vehicle according to claim 1, wherein the converting structure includes a second inclined surface, and the second inclined surface is formed at the shaft and is constructed so as to slidably contact the first rod when the movable member is at the closed position and the knob is operated.

5. An interior apparatus of a vehicle according to claim 1, wherein the fixed member includes a block movably coupled to the fixed member, and the block contacts the movable member when the movable member is at the closed position, and
wherein the converting structure includes a third inclined surface provided at the block, and the third inclined surface is constructed so as to slidably contact the shaft when the movable member is at the closed position and the knob is operated.

* * * * *